(No Model.)
B. S. HARRISSON.
TRUCK.
No. 249,346.   Patented Nov. 8, 1881.
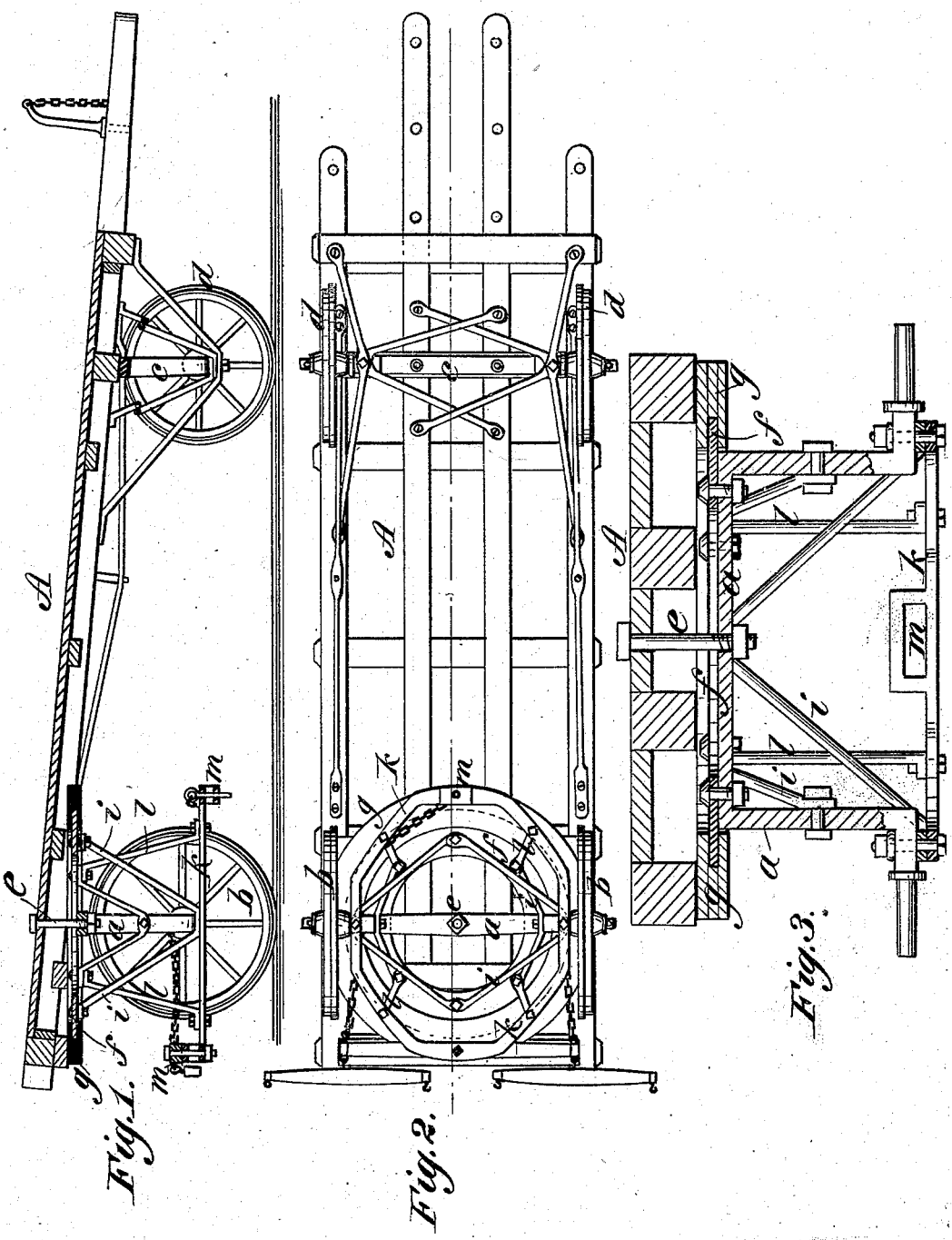
WITNESSES:
Dorm Twitchell.
C. Sedgwick.
INVENTOR:
B. S. Harrison
BY Munn & Co
ATTORNEYS.

UNITED STATES PATENT OFFICE.

BENJAMIN S. HARRISSON, OF NEW ORLEANS, LOUISIANA.

TRUCK.

SPECIFICATION forming part of Letters Patent No. 249,346, dated November 8, 1881.

Application filed August 17, 1881. (No model.)

*To all whom it may concern:*

Be it known that I, BENJAMIN S. HARRISSON, of New Orleans, in the parish of Orleans and State of Louisiana, have invented a new and Improved Wagon or Truck, of which the following is a full, clear, and exact description.

My improvements relate to trucks or wagons used for carrying heavy loads. As usually made, the hind wheels are of wider gage, so that such wagons will not take the street-railroad tracks, except at one side, in a manner that strains the running-gear.

The object of my invention is to secure uniform gage of the front and rear wheels without sacrifice of width and other useful features of the ordinary construction, so that such wagons will take the track, which is a matter of importance in cities where street-railways are numerous.

In the accompanying drawings, Figure 1 is a sectional side elevation of a wagon of my improved construction. Fig. 2 is an inverted plan view of the same. Fig. 3 is a vertical cross-section at the forward axle with the parts in larger size.

Similar letters of reference indicate corresponding parts.

A is the platform; $a$, the forward axle, supported on wheels $b\ b$; and $c$ is the rear axle, supported on the wheels $d\ d$, that are of smaller diameter than wheels $b$. The forward axle, $a$, is arched, and a king-bolt, $e$, connects the axle to the platform A. Upon this axle is connected a ring, $f$, the edge of which takes into a circular groove formed at the inner periphery of a ring, $g$, that is attached beneath platform A, so that the ring $f$ is sustained by the outer ring and is free to turn therein. These parts constitute a fifth-wheel, and also perform the functions of a king-bolt, so that such bolt may be dispensed with, if desired. The wheels $b\ b$ are beneath the ring $g$, and are thus brought within the width of platform A. The rear axle, $c$, is also arched, and its wheels $d$ gage with the front wheels. The rear wheels being of smaller diameter, and the rear axle arched lower than the front axle, the rear end of the platform A is thus brought sufficiently low for convenience of loading the truck. The forward axle, $a$, and the ring $f$ are stiffened by braces $i$.

$k$ is a ring connected to the ends of the axle, and further sustained by braces $l$, which ring is provided with sockets $m$ for a pole, or shafts may be connected to the ring $k$. The rear axle is braced directly to the platform.

The wheels of the truck may have flanged tires, as shown, to fit rails of ordinary construction.

Having thus fully described my invention, what I claim as new, and desire to secure by Letters Patent, is—

1. The combination, with the platform A and the grooved ring $g$, secured to the under side of the platform, of the arched axle $a$ and ring $f$, secured to the upper surface of the said axle, and adapted to work in the groove of the said ring, substantially as and for the purpose set forth.

2. The combination, with the platform A and the arched axle $a$, of the bolt E, the ring $f$, and the grooved ring $g$, substantially as and for the purpose set forth.

3. The ring $k$ and fifth-wheel $f\ g$, connected together and to the arched axle $a$ by braces $i\ l$, substantially as shown and described.

BENJAMIN SIMPSON HARRISSON.

Witnesses:
M. CAHILL,
DANIEL P. MARCY.